United States Patent
Jones (10) Patent No.: US 7,509,825 B2
(45) Date of Patent: Mar. 31, 2009

(54) AUTOMATIC BALANCING DEVICE

(75) Inventor: David Michael Jones, Dursley (GB)

(73) Assignee: Dyson Technology Limited, Wiltshire (GB)

( * ) Notice: Subject to any disclaimer, the term of this patent is extended or adjusted under 35 U.S.C. 154(b) by 586 days.

(21) Appl. No.: 10/515,021

(22) PCT Filed: May 6, 2003

(86) PCT No.: PCT/GB03/01899

§ 371 (c)(1),
(2), (4) Date: Nov. 22, 2004

(87) PCT Pub. No.: WO03/098070

PCT Pub. Date: Nov. 27, 2003

(65) Prior Publication Data

US 2005/0144736 A1 Jul. 7, 2005

(30) Foreign Application Priority Data

May 22, 2002 (GB) ................................ 0211706.7
Aug. 19, 2002 (GB) ................................ 0219230.0

(51) Int. Cl.
*D06F 29/00* (2006.01)
(52) U.S. Cl. .............................. 68/23.2; 68/24; 68/139; 74/573.1
(58) Field of Classification Search ................. 68/23.1, 68/23.2, 24, 139, 140; 74/571.1, 571.11, 74/573.1
See application file for complete search history.

(56) References Cited

U.S. PATENT DOCUMENTS

| 2,984,094 | A | | 5/1961 | Belaieff et al. |
|---|---|---|---|---|
| 3,178,916 | A | | 4/1965 | Belaieff et al. |
| 3,356,222 | A | * | 12/1967 | Belaieff ...................... 210/363 |
| 5,806,349 | A | * | 9/1998 | Kim et al. .................... 68/23.2 |
| 5,857,360 | A | * | 1/1999 | Kim et al. .................... 68/23.2 |
| 5,916,274 | A | * | 6/1999 | Lee et al. ..................... 68/23.2 |
| 6,116,112 | A | * | 9/2000 | Sohn ......................... 74/570.2 |
| 6,119,547 | A | * | 9/2000 | Goransson et al. ......... 74/572.4 |
| 6,439,003 | B1 | * | 8/2002 | Uhlin ......................... 68/23.2 |
| 6,442,782 | B1 | * | 9/2002 | Vande Haar .................. 8/159 |
| 6,550,292 | B1 | * | 4/2003 | Southworth et al. .......... 68/23.2 |
| 6,658,902 | B2 | * | 12/2003 | Southworth et al. .......... 68/23.2 |

FOREIGN PATENT DOCUMENTS

| GB | 1035033 | 7/1966 |
|---|---|---|
| GB | 1092188 | 11/1967 |
| GB | 2104553 A | 3/1983 |
| GB | 2111169 A | 6/1983 |
| JP | 3-111096 | 5/1991 |
| JP | 03261500 | 11/1991 |

* cited by examiner

*Primary Examiner*—Joseph L Perrin
(74) *Attorney, Agent, or Firm*—Morrison & Foerster LLP (57) ABSTRACT

Provided herein is an automatic balancing device for counterbalancing an out-of-balance mass present in a rotating body. The automatic balancing device includes a chamber with an outer wall and an axis, first and second counterbalancing masses constrained to move freely in a circular path about the axis within the chamber, and a viscous fluid provided in the chamber so as to provide viscous coupling between the outer wall of the chamber and each of the counterbalancing masses. The counterbalancing masses may be arranged so that the first counterbalancing mass leads the second counterbalancing mass when the device is in use. A constraint may be provided with the device so as to prevent the first counterbalancing mass from leading the second counterbalancing mass by more than substantially 180°.

24 Claims, 8 Drawing Sheets

AUTOMATIC BALANCING DEVICE

FIELD OF THE INVENTION

The invention relates to an automatic balancing device for counterbalancing an out-of-balance mass present in a rotating body. Particularly, but not exclusively, the invention relates to an automatic balancing device for use in washing machines and for counterbalancing out-of-balance masses present in the washing machine during washing and spinning cycles.

BACKGROUND OF THE INVENTION

Automatic balancing devices for counterbalancing out-of-balance masses are known in many different applications. However, the most complex out-of-balance situations occur when both the position and size of the out-of-balance mass is unpredictable and the speed of rotation is variable, as in the case of a washing machine. Many different automatic balancing devices have been proposed and used in washing machines and many of these are effective at counterbalancing out-of-balance masses at speeds above the critical speed (ie. the speed of resonance of the system). Examples of this type of automatic balancing device are shown in GB1,035,033; GB1,092,188; WO 93/23687; WO 95/32372; U.S. Pat. Nos. 5,813,253; 5,862,553; DE1 912 481. All of the devices shown in these documents make use of the phenomenon by means of which, at speeds of rotation above the critical speed, freely rotatable counterbalancing masses automatically take up positions in which the out-of-balance mass is counterbalanced. However, it is recognised in some of the aforementioned documents that, at speeds below the critical speed, freely rotating counterbalancing masses act so as to exacerbate the excursion of the rotating body due to the presence of the out-of-balance mass. In these cases, the counterbalancing masses are proposed to be locked in a fixed position with respect to the chamber in which they are located when the body is rotating at a speed below the critical speed. In the case of U.S. Pat. No. 5,813,253, a roller locates in a recess in order to prevent the balancing masses from moving along the annular path in which they run. The roller is released from the recess when the body exceeds the critical speed. In GB1,092, 188, the counterbalancing masses are pivotably mounted about an axle with locking members provided to lock the masses in a fixed position with respect to the chamber in which they are housed when the speed of rotation is below critical. The locking means release when the speed is above critical. It is also envisaged in this prior art document that the counterbalancing members could be locked together, so that they have a zero net out-of-balance effect until the critical speed has been exceeded.

The known mechanisms by means of which counterbalancing masses can be locked in a position in which they have a zero net out-of-balance effect are generally difficult and expensive to manufacture. They are susceptible to damage in view of the movement of the counterbalancing masses, which can sometimes be quite violent. However, in arrangements which do not lock the counterbalancing masses, acceleration of the drum of the washing machine from a below-critical speed to an above-critical speed can cause extreme excursion, especially at the critical speed.

SUMMARY OF THE INVENTION

It is an object of the invention to provide an automatic balancing device for counterbalancing an out-of-balance mass present in a rotating body in which, during acceleration through the critical speed, the amount of excursion of the rotating body is minimised. It is a further object of the present invention to provide an automatic balancing device which is economic to manufacture and less susceptible to damage than known arrangements. It is a further object of the present invention to provide a method of operating a washing machine in which rotation of the drum can be accelerated through the critical speed with the minimum of excursion.

The invention provides an automatic balancing device for counterbalancing an out-of-balance mass present in a rotating body, the automatic balancing device comprising a chamber having an outer wall and an axis, first and second counterbalancing masses constrained to move freely in a circular path about the axis and within the chamber, and a viscous fluid provided in the chamber so as to provide viscous coupling between the outer wall of the chamber and each of the counterbalancing masses when the device is in use, characterised in that the counterbalancing masses are adapted and/or arranged such that, in use, the first counterbalancing mass leads the second counterbalancing mass, and constraining means are provided so as to prevent the first counterbalancing mass from leading the second counterbalancing mass by more than substantially 180° when the device is in use.

Preferably, the first counterbalancing mass has a moment of inertia which is lower than that of the second counterbalancing mass. More preferably, the viscous coupling between the first counterbalancing mass and the outer wall of the chamber is higher than the viscous coupling between the second counterbalancing mass and the outer wall of the chamber.

The arrangement on this invention has been found to be effective in reducing the amount of excursion of the rotating body in comparison to an arrangement utilising no counterbalancing means, at least when used in a washing machine. Indeed, the claimed arrangement is capable of reducing the maximum excursion of the rotating drum of a washing machine to a level significantly below that currently achieved by commercially available washing machines which utilise a known balancing device. The reduction in excursion is particularly important as the rotating body passes through the critical speed as the excursion is largest at this speed. Reducing the excursion, particularly at the critical speed, allows washing machines and other similar devices to be manufactured with larger drums because less provision for excursion needs to be made. Also, less ballast needs to be provided.

The arrangement of this invention is also very simple to manufacture and reliable in operation. In place of the known locking arrangements described in the prior art discussed above, the constraining means can take a very simple form which results in higher reliability and lower failure rates than more complex arrangements. The manufacturing cost of the claimed arrangement is also lower than the cost of the known prior art arrangements.

The arrangement of this invention is believed to operate in the following manner. When the rotating body is rotated at a speed below critical but sufficient to cause the counterbalancing masses to rotate within the chamber, the counterbalancing masses spread apart because the first counterbalancing mass leads the second counterbalancing mass. As the speed of the device increases, the spread of the masses will increase until, when the spread is at or near 180°, they are prevented from spreading apart any further by the constraining means. In this position, i.e., when the masses are spread apart by approximately 180°, they contribute little or nothing to the out-of-balance mass present in the rotating body and the excursion of the rotating body is not exacerbated. However, at the same time, the excursion of the rotating body causes the masses to be drawn towards one another. Because the masses are free to move with respect to the chamber (within the constraints applied by the constraining means), they move towards one another thereby effecting a partial balancing of the out-of-balance mass in the rotating body. This movement of the masses affects the phase and size of the excursion of the rotating body which then causes further movement of the masses in response. Hence the masses are in constant movement with respect to the chamber, continually moving into a position in which the out-of-balance mass is partially balanced. This results in a reduction of the excursion of the rotating body.

It is also believed that, as the speed of rotation of the rotating body approaches resonance (the critical speed), the counterbalancing masses tend towards a position in which the out-of-balance mass is fully balanced. Thus the amount by which the excursion of the rotating body is reduced increases as the rotating body approaches resonance.

The invention also provides a method of operating a washing machine having a drum and incorporating the automatic balancing device described above, the method comprising the steps of:

(a) rotating the drum and the automatic balancing device at a speed below the critical speed of the washing machine whilst allowing each of the counterbalancing masses to rotate freely about the axis;
(b) causing the first counterbalancing mass to lead the second and any further counterbalancing mass;
(c) preventing the first counterbalancing mass from leading the second and any further counterbalancing mass by more than substantially 180°; and
(d) increasing the speed of rotation of the drum to a speed above the critical speed of the washing machine.

Preferably, the method comprises the further steps of:

(e) detecting variations in the amplitude of excursion of the drum due to the presence of an out-of-balance load therein and the counterbalancing masses;
(f) detecting a minimum amplitude of excursion; and
(g) commencing the increase in the speed of rotation of the drum to a speed above the critical speed of the washing machine at a time when the amplitude of excursion is at or close to a minimum.

Preferably, the speed of rotation of the drum is increased from a speed below the critical speed of the washing machine to a speed above the critical speed of the washing machine at a rate of between 5 rpm/s and 50 rpm/s, more preferably between 5 rpm/s and 15 rpm/s.

It is believed that the rate of acceleration of the drum can have an effect on the amount by which the excursion of the rotating body is reduced. Slower rates of acceleration have been shown to improve the effect. It is believed that this is due to the fact that slower rates of acceleration allow the counterbalancing masses time to adopt new, advantageous positions which will minimize the excursion experienced as the rotating body passes through resonance.

BRIEF DESCRIPTION OF THE DRAWINGS

Embodiments of the invention will now be described by way of example only and with reference to the accompanying drawings, in which.

DETAILED DESCRIPTION OF THE INVENTION

Figure 1:
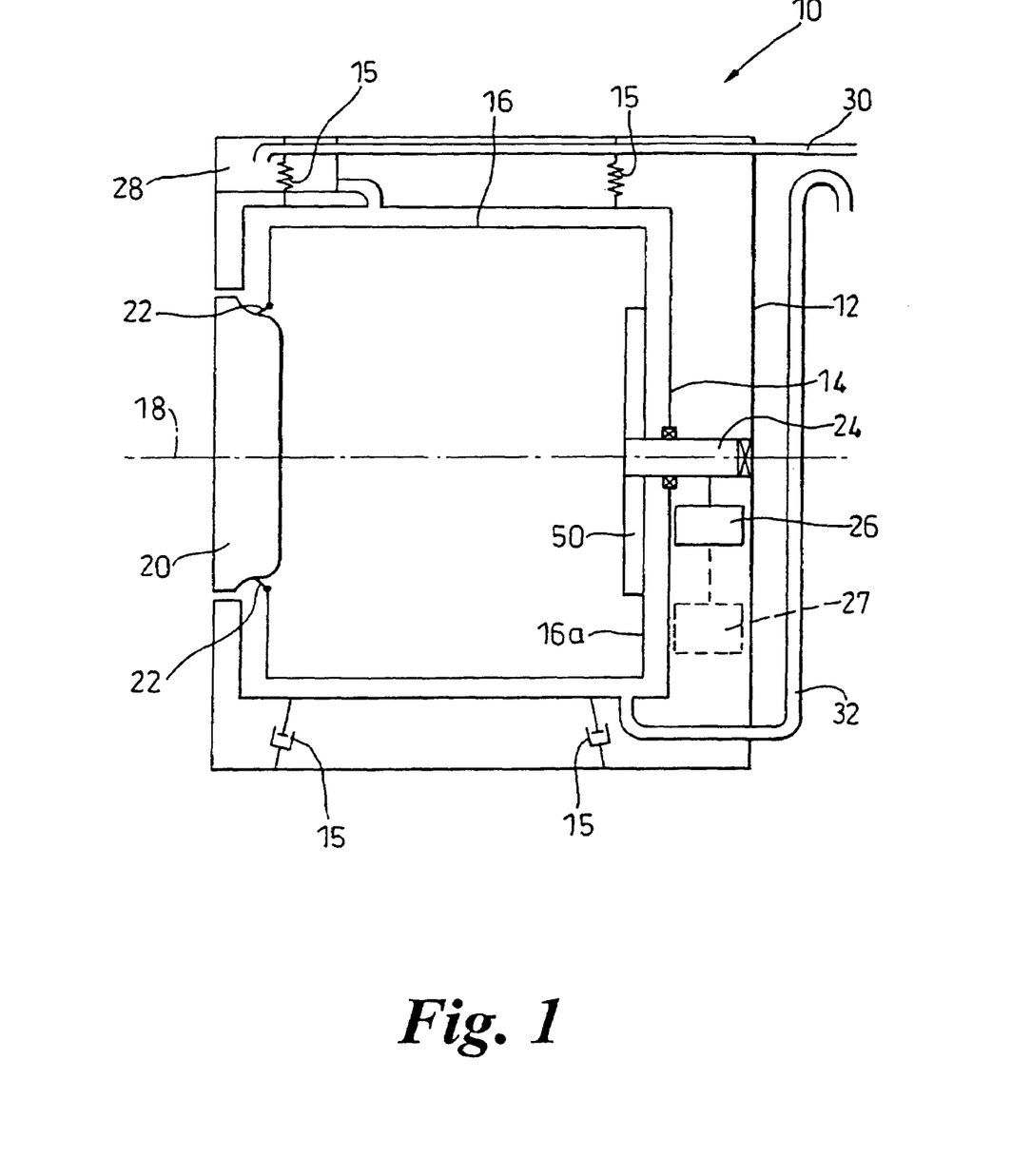
FIG. 1 is a schematic sectional side view of a washing machine incorporating an automatic balancing device according to a first embodiment of the invention.

FIG. 1 illustrates a typical environment in which an automatic balancing device is useful and desirable. FIG. 1 shows a washing machine 10 having an outer casing 12 and a tub 14 mounted inside the outer casing 12 by way of a system of springs and dampers 15. A perforated drum 16 is mounted inside the tub 14 so as to be rotatable about an axis 18. In this embodiment, the axis 18 extends horizontally although this is not essential. A hinged door 20 is located in the front face of the outer casing 12 in such a manner that, when the door 20 is in a closed position (as illustrated), the tub 14 is sealed in a watertight manner. The door 20 is openable to allow articles of laundry to be placed inside the drum 16 prior to the commencement of a washing cycle to be carried out by the washing machine 10. Flexible seals 22 are also provided between the drum 16 and the door 20 so that moderate movements of the drum 16 with respect to the outer casing 12 can be tolerated.

The drum 16 is mounted in a rotatable manner by way of a shaft 24 which is supported in cantilever fashion in the washing machine 10 and driven by a motor 26. The shaft 24 passes through the tub 14 and into the interior thereof so as to support the drum 16. The drum 16 is fixedly connected to the shaft 24 so as to rotate therewith about the axis 18. It will be understood that the shaft 24 passes through the wall of the tub 14 in such a manner as to cause no rotation of the tub 14. Such mounting arrangements are well known in the art. The washing machine 10 also includes a soap tray 28 for the introduction of detergent, one or more water inlet pipes 30 leading to the tub 14 via the soap tray 28, and a water drain 32 communicating with the lower-portion of the tub 14.

All of the features thus far described in relation to the washing machine 10 are known per se and do not form essential parts of the present invention. Common variants of any or all of these features may therefore be included in a washing machine capable of incorporating or utilising an automatic balancing device according to the invention if desired.

The present invention relates to an automatic balancing device suitable for use in a washing machine of the general type described above. In the embodiment shown, the automatic balancing device 50 is located on the distal end of the shaft 24, inside the drum 16 and adjacent the rear wall 16a thereof. However, an automatic balancing device 50 of the type described below can also be located on the outside of the drum 16, still adjacent the rear wall 16a thereof, but on the side facing the tub 14. It is also possible to provide the automatic balancing device at other positions along the shaft 24; for example, between the tub 14 and the outer casing 12, although such an arrangement is not the preferred position.

Figure 2:
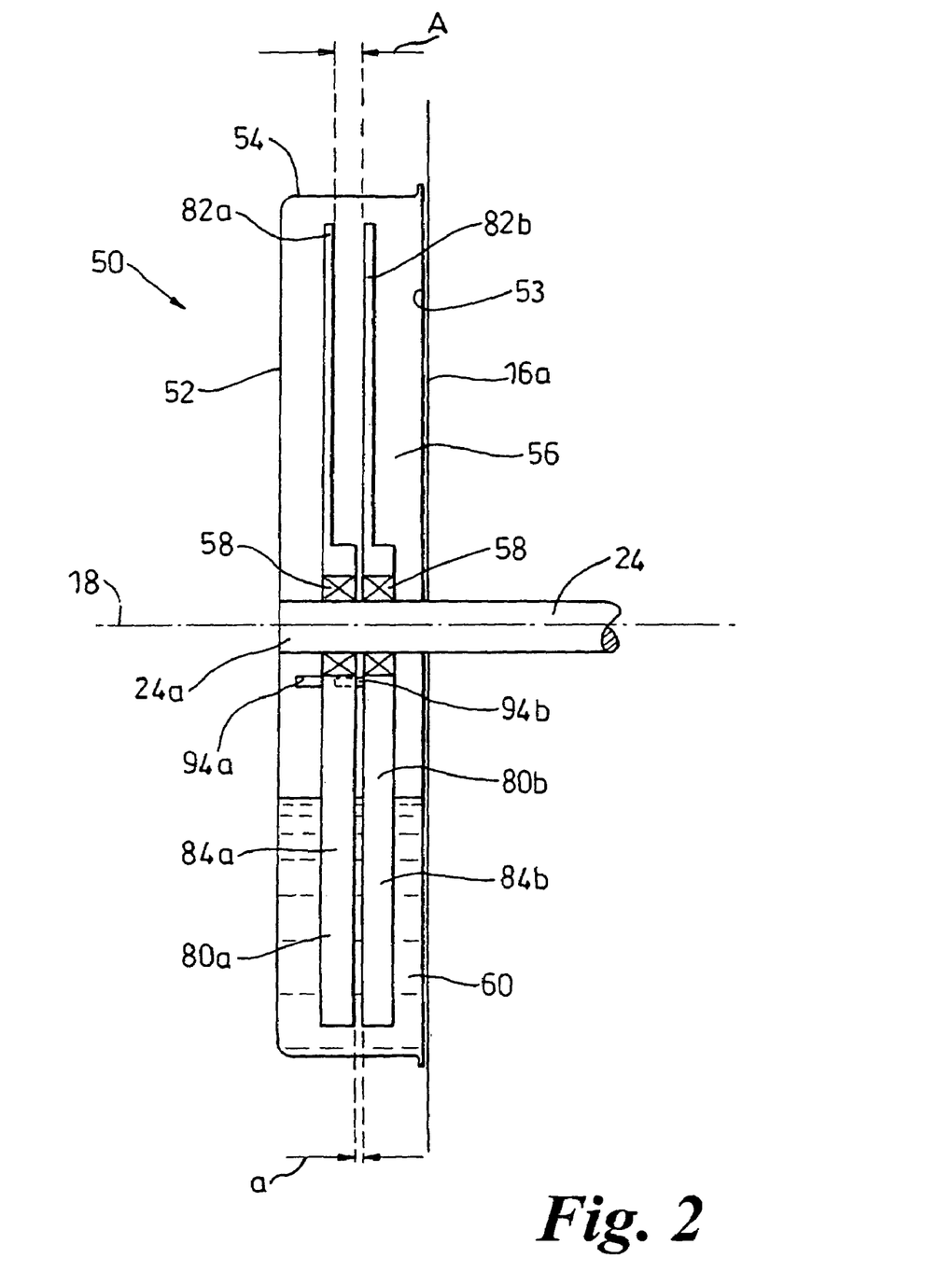
FIG. 2 is a sectional side view through the automatic balancing device shown in FIG. 1.

The automatic balancing device 50 is illustrated in a rest position in FIG. 2. The automatic balancing device 50 has a cup-shaped cover 52 which, together with a circular plate 53 lying next to the rear wall 16a of the drum 16, forms an outer wall 54 defining a chamber 56. The cover 52 is fixedly attached to the circular plate 53 so that the chamber 56 is liquid-tight for reasons which will be explained below. The means of connection between the cover 52 and the circular plate 53 are not material to the invention. The circular plate 53 can be attached to the rear wall 16a of the drum 16 if desired. The cover 52 is fixedly attached to the distal end 24a of the shaft 24 and is rotatable therewith so that, when the shaft 24 is rotated by the motor 26 about the axis 18, the cover 52 is rotated as well. The shaft 24 passes through the chamber 56 from the circular plate 53 to the cover 52.

Two counterbalancing masses 80a, 80b are rotatably mounted on the shaft 24. The masses 80a, 80b are mounted on the shaft 24 via bearings 58 so that the masses 80a, 80b are able to rotate freely about the shaft. Means (not shown) are provided on the shaft 24 for preventing the masses 80a, 80b from moving axially along the shaft 24, their positions being maintained with respect to one another and with respect to the cover 52. The chamber 56 contains a pool of oil 60 (or other viscous liquid) which is sufficiently deep to ensure that the counterbalancing masses 80a, 80b are partially submerged as shown in FIG. 2. Indeed, it is preferred that there is sufficient oil 60 in the chamber 56 to ensure that, when the automatic balancing device 50 is rotated at a speed sufficient to distribute the oil 60 about the periphery of the chamber 56, the counterbalancing masses 80a, 80b are still partially submerged in, or at least in contact with, the oil 60.

The counterbalancing masses 80a, 80b are identical to one another. The configuration of one of the masses 80a is shown in detail in FIGS. 3a and 3b. Essentially, the mass 80a comprises a disc portion 82a which is relatively slim in depth and circular in plan view. A mass portion 84a is provided on the disc portion 82a and is rigidly fixed thereto. Indeed, the mass portion 84a can be formed integrally with the disc portion 82a if desired. In the embodiment shown, the mass portion 84a overlies an area of the disc portion 82a amounting to approximately one quarter, but the extent of overlie is not important. What is important is that the shape of the mass portion allows the centre of gravity of the mass 80a to be located a significant distance from the centre of the disc portion 82a. A central aperture 86a is located in the geometric centre of the disc portion 82a and passes through both the disc portion 82a and the mass portion 84a. The aperture 86a is dimensioned so as to receive the bearings 58 by means of which the mass 80a is mounted on the shaft 24. The function of the mass portion 84a is to provide the counterbalancing mass 80a with an eccentric centre of gravity and sufficient mass to allow the mass 80a to function as a counterbalance to an out-of-balance load present in the drum 16 of the washing machine 10 during its operation.

Figure 3A:
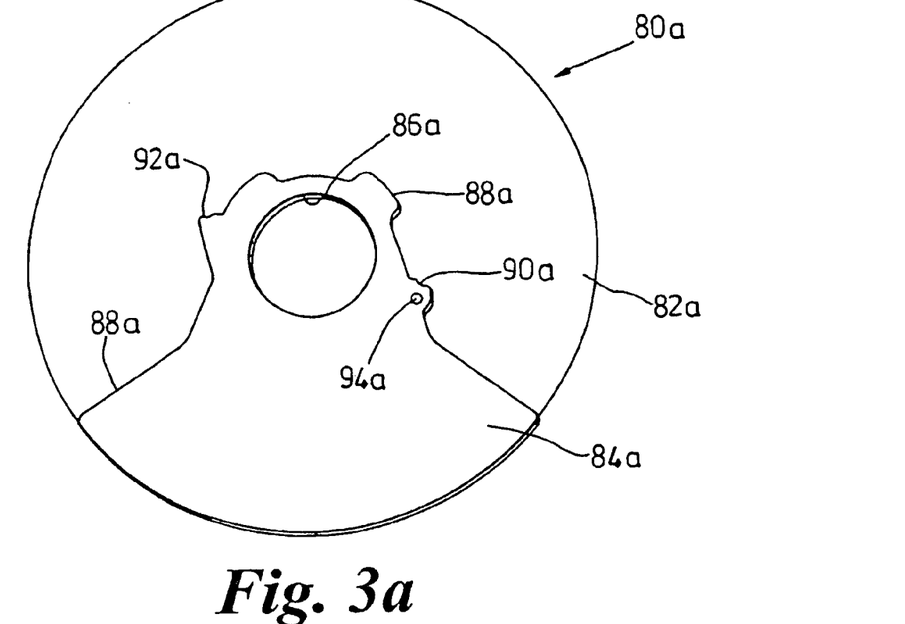
FIG. 3a is a plan view of one of the counterbalancing masses forming part of the automatic balancing device shown in FIG. 2.
Figure 3B:
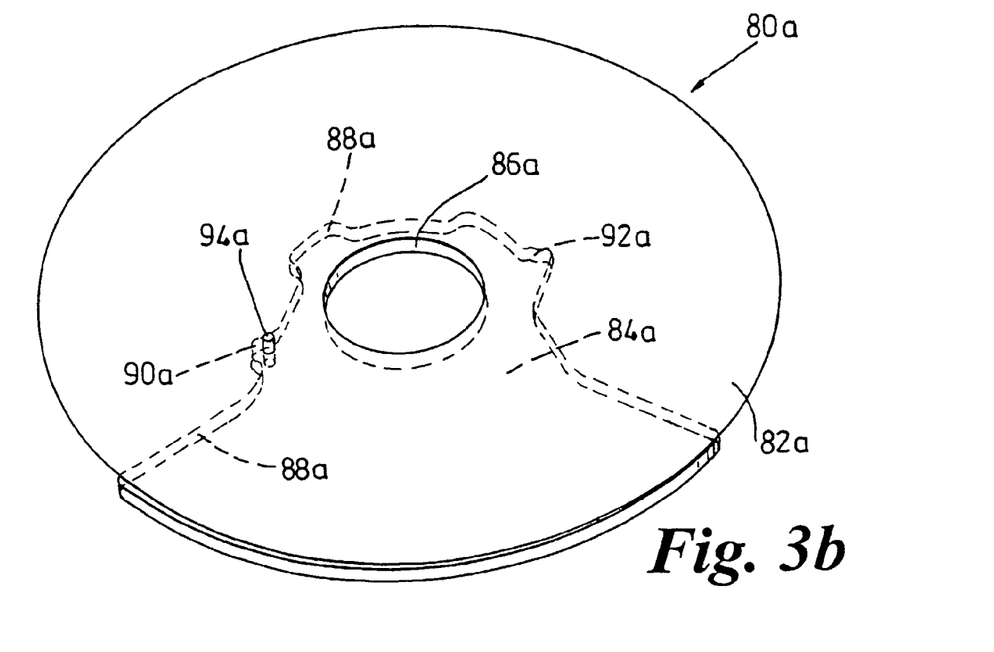
FIG. 3b is a perspective view of the counterbalancing mass of FIG. 3a from the opposite side.

The mass portion 84a is delimited by an edge or lip 88a. The edge or lip 88a comprises a surface which extends generally perpendicular to the circular faces of the disc portion 82a. The edge or lip 88a includes two abutment surfaces 90a, 92a whose function will be described below.

The mass 80a carries a pin 94a which protrudes beyond the surface of the disc portion 82a but does not protrude beyond the surface of the mass portion 84a. The pin 94a extends beyond the surface of the disc portion 82a, and perpendicular thereto, by an amount which is greater than the smallest distance a between the counterbalancing masses 80a, 80b as shown in FIG. 2. However, the distance protruded by the pin 94a is not as great as the larger distance A between the two masses 80a, 80b, as will be explained below.

The counterbalancing mass 80b is identical to the counterbalancing mass 80a described above. Parts of the counterbalancing mass 80b will now be referred to using the reference numeral assigned to the corresponding part of mass 80a, but with the letter "a" replaced by the letter "b".

The arrangement of the counterbalancing masses 80a, 80b in the automatic balancing device 50 is shown in FIG. 2. The first counterbalancing mass 80a is positioned to the left as shown and the second counterbalancing mass 80b is positioned to the right. As has been mentioned, the distance a between the masses 80a, 80b in the area where the mass portions 84a, 84b overlap is less than the distance by which the pin 94b protrudes beyond the disc portion 82b of the mass 80b. However, the distance A between the disc portions 82a, 82b is greater than the extent of protrusion of the pin 94b from the disc portion 82b. Thus the distal end of the pin 92b is constrained to travel between the abutment surfaces 90a, 92a passing across the disc portion 82a and not across the mass portion 84a. At each end of the possible travel path of the pin 94b relative to the mass 80a, the pin 94b will contact one of the two abutment surfaces 90a, 92a of the other mass 80a.

Figure 4A:
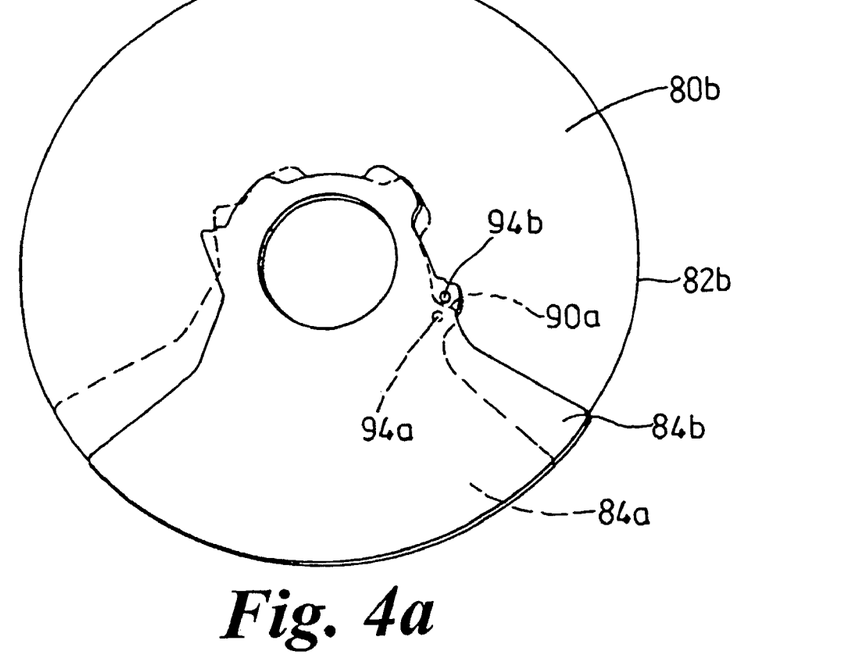
FIG. 4a illustrates the interaction of two counterbalancing masses of the type shown in FIGS. 3a and 3b in use in the automatic balancing device of FIG. 2 in a first position.

The rest position of the two masses 80a, 80b is shown in FIG. 4a. The fact that the masses 80a, 80b are identical means that, in the absence of the pin 94b, the masses 80a, 80b would lie alongside one another in alignment. However, because the pin 94b may not lie alongside the mass portion 84a of the mass 80a, it abuts against the abutment surface 90a of the mass 80a. Hence the masses 80a, 80b lie slightly out of alignment in the rest position as shown in FIG. 4a. It will be appreciated that, in the arrangement shown in FIG. 2, the pin 92a of the mass 80a is in fact redundant.

In operation, the automatic balancing device 50 operates as follows. Rotation of the drum 16 is effected by rotation of the shaft 24. The automatic balancing device 50 rotates with the shaft 24 and the drum 16 so that the whole of the outer wall 54 of the chamber 56 rotates at a relatively high speed. By this we mean that the speed of rotation of the drum 16, and thus the chamber 56, is sufficient to create centrifugal forces which will overcome gravitational forces and so maintain the load contained within the drum pressed against the wall thereof but is below the critical speed of the washing machine. Hence the counterbalancing masses 80a, 80b are not in a position to perform an automatic counterbalancing function. However, the viscous coupling provided by the oil 60 between the outer wall 54 of the chamber 56 and the counterbalancing masses 80a, 80b will cause the counterbalancing masses 80a, 80b to rotate about the shaft 24. Due to the dynamics of the system, the masses 80a, 80b will rotate about the shaft 24 at a rotational speed which is lower than that of the shaft 24 and the drum 16. Because of the shaping of the masses 80a, 80b, and particularly the fact that a significant proportion of the surface of the mass 80b facing the circular plate 53 is spaced further from the circular plate 53 than the whole of the surface of the mass 80a facing the cover 52, the viscous coupling between the outer wall 54 and the mass 80a will be higher than the viscous coupling between the outer wall 54 and the mass 80b. Hence, the mass 80a will rotate at a speed closer to that of the drum 16 and the chamber 56 than the mass 80b. The result of this is that the mass 80a will become the leading mass and that the mass 80b will trail behind it. Moreover, the mass 80a will rotate about the shaft 24 at a higher angular velocity than the mass 80b. Furthermore, the abutment of the pin 94b against the abutment surface 90a will eliminate any possibility of the mass 80a from lagging behind the mass 80b. In the embodiment shown, the location of the pin 94b and the abutment surface 90a will in fact ensure that the mass 80a always leads the mass 80b.

Figure 4B:
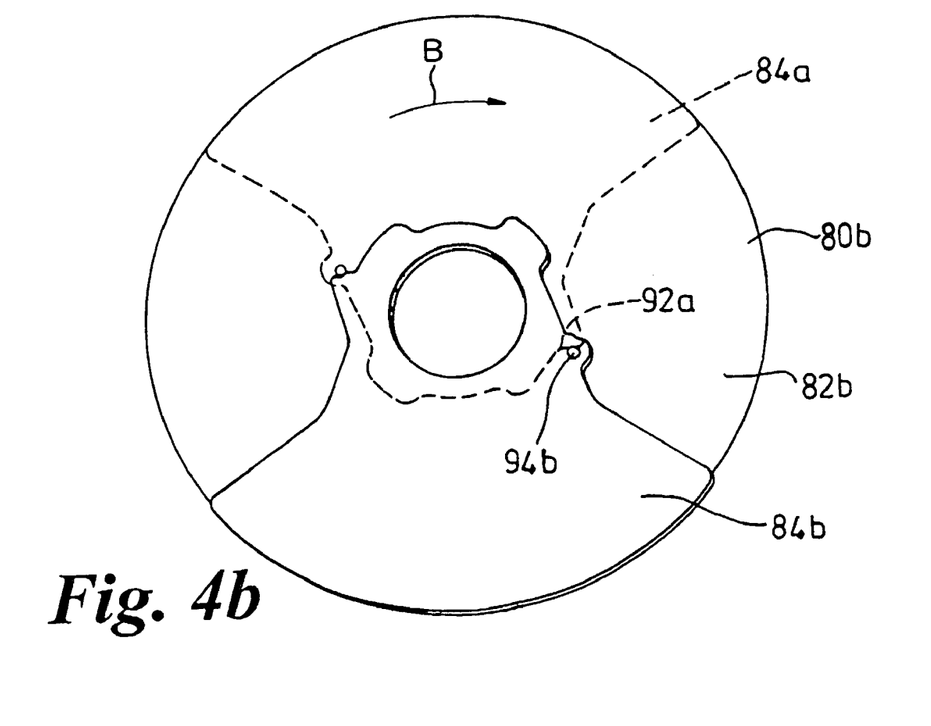
FIG. 4b illustrates the interaction of the same two counterbalancing masses in a second position.

As the drum 16 and chamber 56 rotate about the shaft 24 in the direction shown by the arrow B in FIG. 4b, the trailing mass 80b will trail further behind the leading mass 80a. The masses 80a, 80b thus spread apart with the mass 80a leading and the mass 80b trailing behind it by an increasing amount. However, as the angle by which the mass 80b trails the mass 80a approaches 180° (see FIG. 4b), the pin 94b abuts against the abutment surface 90a thus preventing the mass 80b from lagging behind the mass 80a by more than 180°. In the embodiment shown, the mass 80b is constrained to lag the mass 80b by less than 180°. Even so, the combined effect of the counterbalancing masses 80a, 80b on the rotating body in this position is small.

It has been found that, by allowing the counterbalancing masses 80a, 80b to rotate freely within the constraints described above, the maximum amount of excursion of the drum 16 can be kept to a minimum as the drum 16 is accelerated from the speed described above, through the critical speed to a spin speed high enough to extract water from the load carried in the drum 16. Spin speeds are commonly 1400 to 1600 rpm at present. It is advantageous if the rate of acceleration of the drum 16 is kept to a moderate rate: a rate of increase of speed of between 5 and 50 rpm per second is generally regarded as favorable, with a rate of increase of 5 to 15 rpm/s being more favorable still. Hence, in operation, the speed of the drum 16 is increased at a rate of between 5 and 50 rpm/s (preferably between 5 and 15 rpm/s) from the relatively high speed mentioned above to a suitable spin speed (typically 1400 to 1600 rpm) without constraining or otherwise locking the counterbalancing masses 80a, 80b to one another or to the outer wall 54 of the chamber 56. In this way, the excursion of the drum 16 at the critical speed is reduced in comparison to other systems. This allows the dimensions of the drum 16 to be maximized for any given size of washing machine and/or the risk of damage occurring when large loads are spun at high speeds to be minimized. Above the critical speed, the masses 80a, 80b automatically adopt positions which will counterbalance any out-of-balance present in the drum 16, as is well known.

Optionally, a sensing device 27 (shown in dotted lines in FIG. 1) may be connected to the motor 26. The sensing device 27 detects the current drawn by the motor 26 and/or the running speed of the motor 26. As the masses 80a, 80b adopt different relative positions, and thus perform a greater or lesser counterbalancing effect over time, either a minimum current drawn by the motor 26 or a maximum speed of rotation of the motor 26 will be indicative of a position of greatest counterbalancing effect. At these positions, the excursion of the drum 16 will be at a minimum for a given speed. It is believed to be beneficial to detect when these periods of minimum excursion occur and to initiate the acceleration of the drum 16 to the required spin speed at a point in time when the excursion is at or close to a minimum. Experimental results have shown that initiating the acceleration at such a time is advantageous in many cases.

In a method of operating the washing machine of FIG. 1, when it is desired to rotate the drum at speeds high enough to extract wash liquor or rinse water by spinning, the drum is first rotated at a speed which is sufficient to stick the washload to the walls of the drum but below the critical speed. The masses 80a, 80b are allowed to rotate freely about the shaft 24, although the engagement of the pin 94b against abutment surfaces 90a, 92a prevents the mass 80b from leading the mass 80a at all or from lagging the mass 80a by more than 180°. The difference in the viscous coupling between the outer wall 54 of the chamber 56 and each of the masses 80a, 80b causes the masses initially to spread apart. Thereafter, the masses 80a, 80b will redistribute themselves under the influence of various forces and will, periodically, take up positions which cause maxima and minima of excursion of the drum 16 and the shaft 24. If the motor 26 has coupled to it a sensing device 27 as described above, the speed of and/or current drawn by the motor 26 is monitored and a minimum value of either characteristic is sensed. The drum 16 is then accelerated to the desired spin speed. This will inevitably require the speed of rotation of the drum to pass through the critical speed, at which the excursion of the drum 16 is greatest. The rate of acceleration is between 5 and 15 rpm/s but could be as high as 50 rpm/s. By allowing the masses 80a, 80b freedom to rotate about the shaft 24 during the acceleration step, the maximum excursion is kept as low as possible. Also, by initiating the acceleration of the drum 16 from the lower speed at a point when the excursion is at or close to a minimum (as sensed by the sensor 27), the excursion experienced by the drum 16 at the critical speed is minimized. Above the critical speed, the masses 80a, 80b position themselves, as is well known, so as to counterbalance the out-of-balance load within the drum 16 and so the excursion of the drum 16 at speeds above critical is greatly reduced and, in some cases, eliminated.

Keeping the maximum excursion of the drum 16 to a minimum is beneficial because a lower provision for excursion then needs be built into the machine and thus the size of the drum 16 can be increased in comparison to other machines. Also, the risk of damage occurring due to excessive excursion of the drum 16 is reduced.

Figure 5:
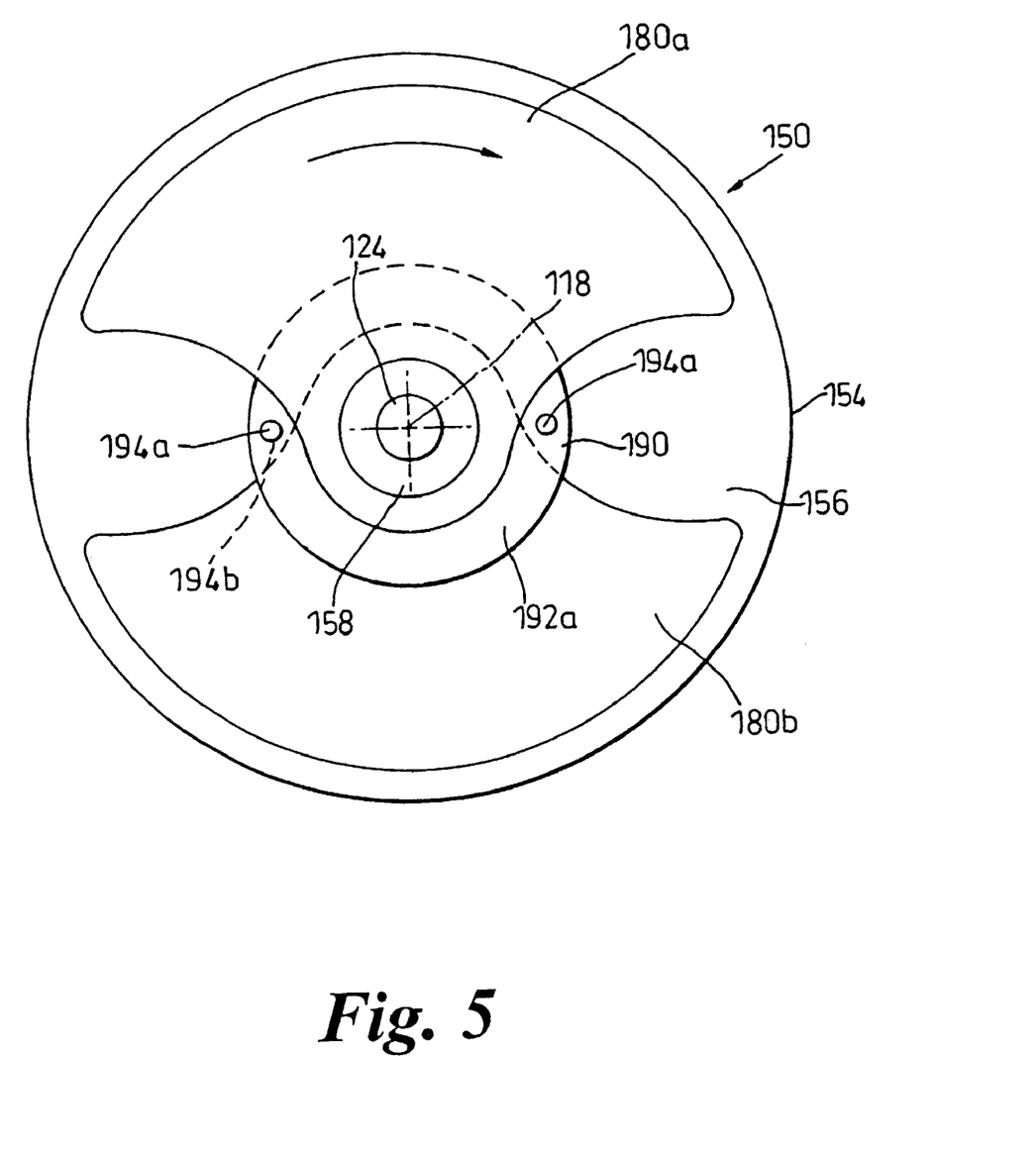
FIG. 5 is a schematic front view of an automatic balancing device according to a second embodiment of the invention.
Figure 6:
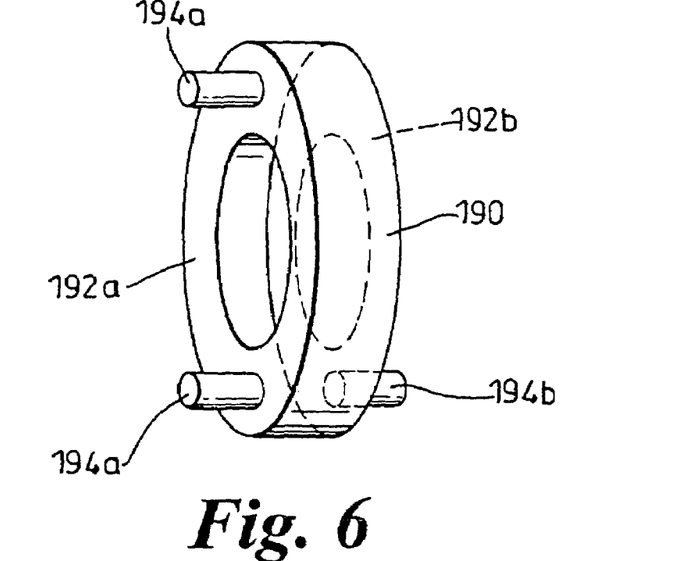
FIG. 6 is a perspective view of a collar forming part of the device of FIG. 5.
Figure 7:
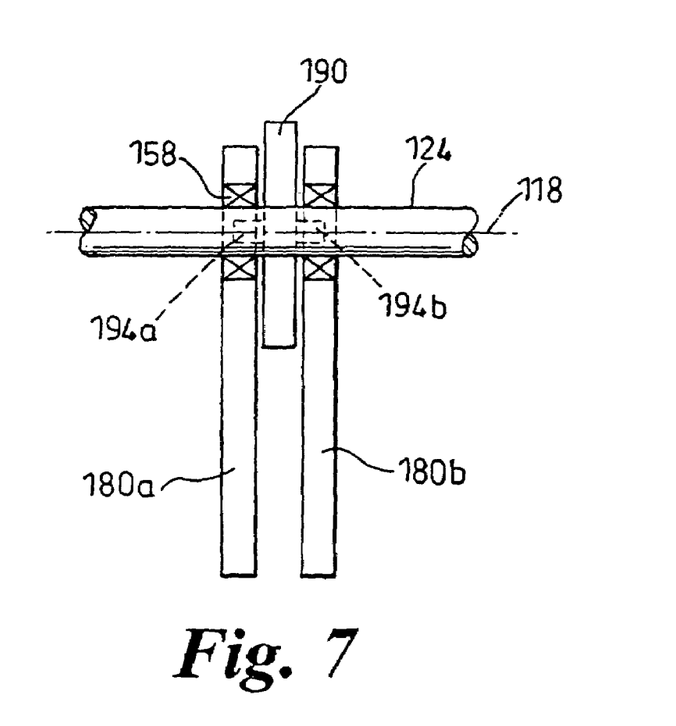
FIG. 7 illustrates the position and operation of the collar of FIG. 6 with respect to two counterbalancing masses forming part of the device shown in FIG. 5.

A second embodiment of the invention is illustrated in FIGS. 5, 6 and 7. FIG. 5 is a cutaway front view of an automatic balancing device 150 having an outer wall 154 delimiting a cylindrical chamber 156. A shaft 124, which is rotatable about an axis 118, passes through the chamber 156. Two counterbalancing masses 180a, 180b are mounted on the shaft 124 via bearings 158 so as to be freely rotatable about the shaft 124. The counterbalancing masses 180a, 180b are shaped so as to increase in breadth with distance from the shaft 124. As with the masses 80a, 80b illustrated in FIGS. 2, 3 and 4, the effect of this is to space the centre of gravity of each counterbalancing mass 180a, 180b away from the axis 118.

Located between the counterbalancing masses 180a, 180b is a collar 190 which is shaped and dimensioned to be supported on and freely rotatable about the shaft 124.

Projecting outwardly from a first annular face 192a of the collar 190 are two diametrically opposed pins 194a. A single pin 194b projects outwardly from a second annular face 192b of the collar 190, the pin 194b being aligned with one of the pins 194a. The pins 194a, 194b project sufficiently far from the respective annular surfaces 192a, 192b to engage with the counterbalancing masses 180a, 180b as they rotate about the shaft 124.

The dimensions of the collar 190 and the positioning of the pins 194a, 194b thereon are such that the pins 194a abut against the edges of the counterbalancing mass 180a with little or no play as shown in FIG. 5. Thus the collar is held in a substantially fixed position with respect to the counterbalancing mass 180a. However, since the counterbalancing mass 180b is acted upon by only the single pin 194b, it is able to move relative to the counterbalancing mass 180a between a first position in which the masses 180a, 180b are aligned and a second position in which the masses 180a, 180b are diametrically opposed. The positioning of the pin 194b is such that the mass 180a is not allowed to lag behind the mass 180b. As in the previous embodiment, the viscous coupling between the outer wall 154 and the mass 180a is higher than that between the outer wall 154 and the mass 180b. This can be achieved in any suitable way.

Figure 8A:
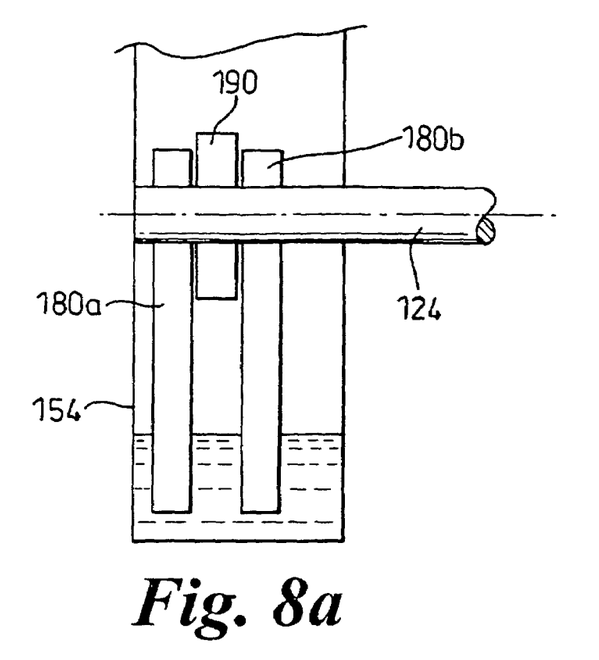
FIG. 8a illustrates the positioning of the masses of FIG. 5 inside a chamber.
Figure 8B:
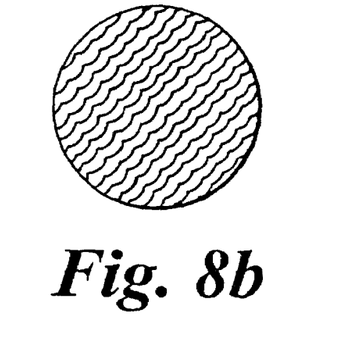
FIG. 8b shows the surface of one of the masses of FIG. 5.

One way to vary the viscous coupling between the outer wall 154 and the respective masses 180a, 180b is illustrated in FIG. 8a. Here, the mass 180a is arranged so as to be closer to the outer wall 154 than the mass 180b. An alternative way of ensuring that the viscous coupling between the outer wall 154 and the mass 180a is higher than that between the outer wall 154 and the mass 180b is to provide the surface of the mass 180a with an uneven or textured finish, as illustrated in FIG. 8b. This non-planar finish need only be applied to the part of the surface of the mass 180a facing the outer wall, if desired, although more of the surface can be finished in this way. Further alternative means for ensuring that the viscous coupling between the outer wall 154 and the mass 180a is higher than that between the outer wall 154 and the mass 180b will be apparent to a skilled reader.

Figure 9:
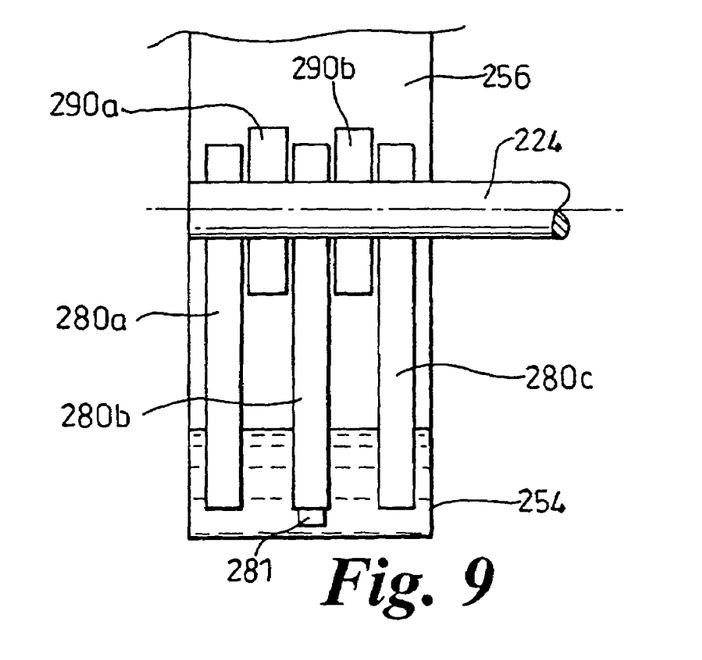
FIG. 9 illustrates a third embodiment of the invention.

In the embodiments described above, only two counterbalancing masses have been provided. It is possible to provide more than two masses and an arrangement showing the use of three masses is shown in FIG. 9. Each mass 280a, 280b, 280c is mounted in a chamber 256 on a shaft 224 so as to be freely rotatable thereabout. Collars 290a, 290b are mounted between each pair of masses 280a, 280b and 280b, 280c as shown. The collars 290a, 290b are similar to the collar 190 shown in FIG. 6 and described above and operate in the same way. However, it is to be noted that the side of each collar 290a, 290b from which two diametrically opposed pins project is arranged so as to face the central mass 280b. This ensures that the other masses 280a, 280c are prevented from leading the central mass 280b or from lagging the central mass 280b by more than 180°. In order to ensure that the viscous coupling between the outer wall 254 of the chamber 256 and the central mass 280b is higher than the viscous coupling between the outer wall 254 of the chamber 256 and the outer masses 280a, 280c, fins 281 are provided on the outer edge of the mass 280b. The distal edges of the fins 281 lie very close to the outer wall 254 of the chamber 256 and provide high viscous coupling for the central mass 280b.

Figure 10A:
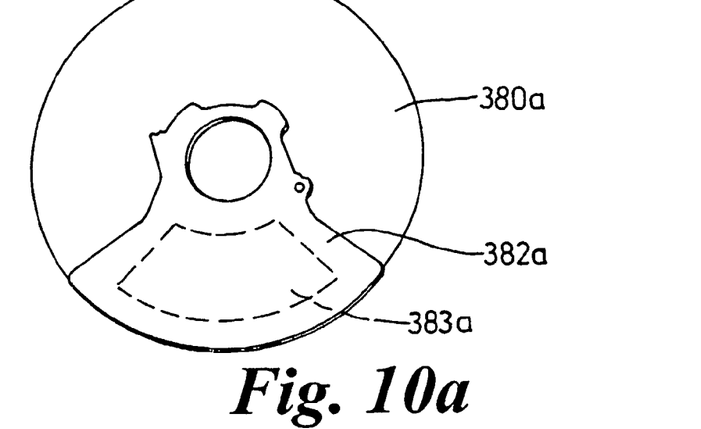
FIGS. 10a, 10b and 10c illustrate alternative counterbalancing masses suitable for use in the embodiments illustrated in FIGS. 1 to 9.
Figures 10B, 10C:
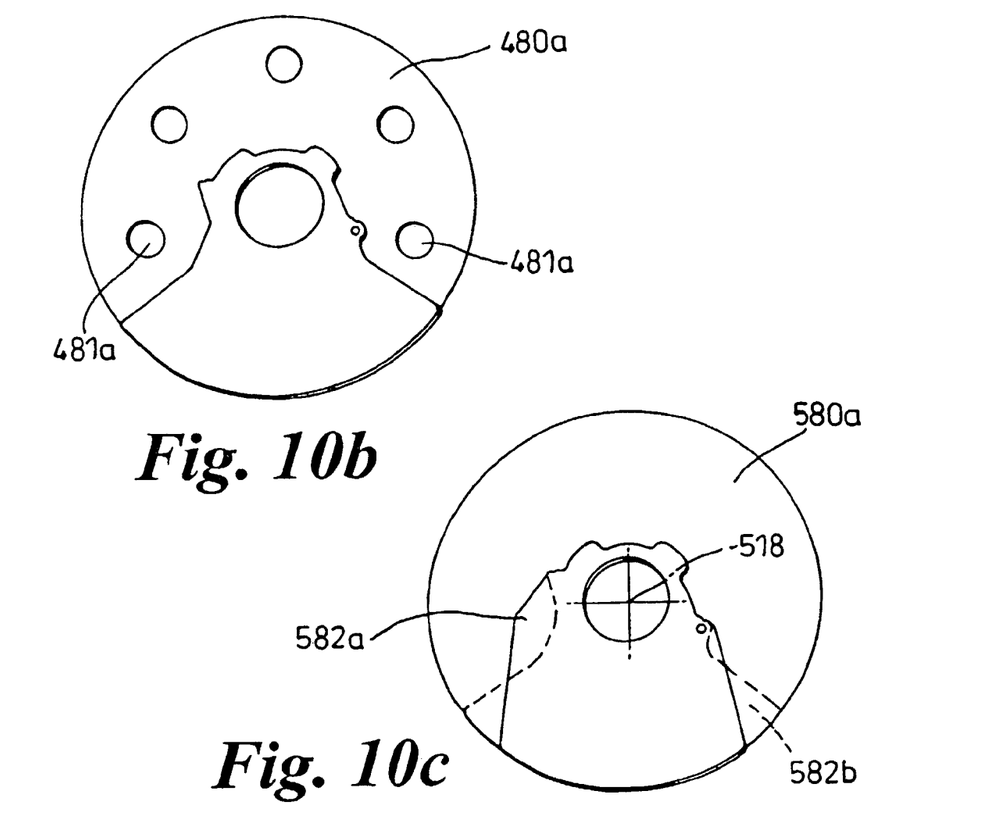

Each of the embodiments described above makes use of a plurality of counterbalancing masses which are identical to one another. By this we mean that the masses are identical in shape and are made from material of the same density so that the centres of gravity of each mass lie at the same point. Different arrangements for ensuring that the first (leading) mass has a different viscous coupling with the wall of the chamber from that of the or each other mass have been described above. However, it is possible to arrange for the first mass always to lead the or each other mass in different ways. One such way is to provide the first mass with a lower moment of inertia than the or each other mass. This can be achieved by ensuring that the centre of gravity of the first counterbalancing mass lies closer to the axis of the chamber than the centre of gravity of the or each other mass. One way to achieve this is to arrange for the mass of the first counterbalancing mass to be lower than that of the or each other counterbalancing mass. This is possible by manufacturing the first counterbalancing mass (or a part thereof) from a material having a lower density than that of the other counterbalancing mass or masses; by providing the mass portion 382a of the first counterbalancing mass 380a with one or more hollow cavities 383a (see FIG. 10a); or by providing the first counterbalancing mass 480a with a number of mass-reducing through-holes 481a (see FIG. 10b). Alternatively, the mass portion 582a of the first counterbalancing mass 580a can be shaped and configured so that, with respect to the or each other counterbalancing mass, the centre of gravity lies closer to the axis 518 than that of any other counterbalancing mass used in the same system (see FIG. 10c in which the shape of the mass portion 582b of another counterbalancing mass is shown in dotted outline). In this arrangement, it is envisaged that the mass of each counterbalancing mass is the same as that of the other counterbalancing masses.

Thus it can be seen that the first counterbalancing mass can be arranged to lead the or each remaining counterbalancing mass by providing it with either a higher viscous coupling with the chamber wall or a lower moment of inertia than that of the or each remaining counterbalancing mass. Other means for arranging for the first counterbalancing mass to lead the or each remaining counterbalancing mass will be apparent to a skilled reader.

The skilled reader will also appreciate that it is possible to rely solely on the means for arranging for the first counterbalancing mass to lead the or each remaining counterbalancing mass and to dispense with any further constraining means which will physically prevent the first counterbalancing mass from lagging the or any other counterbalancing mass. Referring to the embodiment shown in FIGS. 1 to 4, the abutment of the pin 92a against the abutment surface 90a prevents the first counterbalancing mass 80a from lagging the second counterbalancing mass 80b. However, it is possible to rely on the higher viscous coupling between the first counterbalancing mass 80a and the chamber wall 54 to ensure that the first counterbalancing mass 80a leads the second counterbalancing mass 80b and so the abutment surface 90a can be dispensed with. A similar change could be made to the embodiments illustrated in FIGS. 5 to 10.

The scope of the invention is not limited to the embodiments described above. It will be appreciated that the shape of the counterbalancing masses can be varied almost indefinitely as long as the essential counterbalancing function is achieved. Indeed, the counterbalancing masses provided in a single automatic balancing device as described above may be different in shape from one another and do not have to be identical. Different numbers of masses may be provided and alternative means for constraining the relative position of the masses may be provided. A further alternative arrangement contemplated within the scope of the invention is the use of the rear wall of the drum to form part of the outer wall of the chamber of the automatic balancing device. Other variations will be apparent to a skilled reader.

The invention claimed is:

1. An automatic balancing device for counterbalancing an out-of-balance mass present in a rotating body, comprising:
   a chamber having an outer wall and an axis, and which rotates with the rotating body,
   first and second counterbalancing masses spaced along the axis and constrained to move freely in a circular path about the axis and within the chamber such that, when the device is in use, the first counterbalancing mass leads the second counterbalancing mass,
   a viscous fluid provided in the chamber so as to provide viscous coupling between the outer wall of the chamber and each of the counterbalancing masses when the device is in use, and a constraint operating at all speeds of rotation when the device is in use to prevent the first counterbalancing mass from leading the second counterbalancing mass by more than substantially 180° at all speeds of rotation when the device is in use, wherein the first counterbalancing mass and the second counterbalancing mass are spaced along the axis such that the first counterbalancing mass is spaced further from a side of the chamber than the second counterbalancing mass such that the viscous coupling between the first counterbalancing mass and the outer wall of the chamber is higher than the viscous coupling between the second counterbalancing mass and the outer wall of the chamber.

2. An automatic balancing device as claimed in claim 1, wherein the constraint is adapted to ensure that the angle by which the second counterbalancing mass lags the first counterbalancing mass is always less than substantially 180°.

3. An automatic balancing device as claimed in claim 1, wherein the constraint further prevents the first counterbalancing mass from lagging behind the second counterbalancing mass.

4. An automatic balancing device as claimed in claim 3, wherein the constraint is adapted to ensure that the first counterbalancing mass always leads the second counterbalancing mass.

5. An automatic balancing device as claimed in claim 3, further comprising a collar disposed about the axis between the first counterbalancing mass and the second counterbalancing mass, the collar being rotatable freely about the axis, wherein the constraint comprises first and second projections extending outwardly from the collar so as to engage with shapings of the first and second counterbalancing masses and thereby prevent the first counterbalancing mass from lagging behind the second counterbalancing mass.

6. An automatic balancing device as claimed in claim 1, wherein the first counterbalancing mass has a moment of inertia which is lower than that of the second counterbalancing mass.

7. An automatic balancing device as claimed in claim 6, wherein the centre of mass of the first counterbalancing mass lies closer to the axis than the centre of mass of the second counterbalancing mass.

8. An automatic balancing device as claimed in claim 1, wherein the configuration of the first and second counterbalancing masses is adapted to cause the viscous coupling between the first counterbalancing mass and the outer wall of the chamber to be higher than the viscous coupling between the second counterbalancing mass and the outer wall of the chamber.

9. An automatic balancing device as claimed in claim 8, wherein, in use, the viscous fluid is in contact with a larger surface area of the first counterbalancing mass than the second counterbalancing mass.

10. An automatic balancing device as claimed in claim 8, wherein the surface of the first counterbalancing mass has a shaped or textured portion which faces the outer wall of the chamber.

11. An automatic balancing device as claimed in claim 8, wherein the first counterbalancing mass is located closer to the outer wall of the chamber than the second counterbalancing mass.

12. An automatic balancing device as claimed in claim 1, wherein the first and second counterbalancing masses are supported in the chamber on an axle extending concentrically with the axis.

13. An automatic balancing device as claimed in claim 1, wherein the constraint comprises structures provided on the first and second counterbalancing masses.

14. An automatic balancing device as claimed in claim 13, wherein at least one of the structures of the constraint comprises at least one projection extending from the surface of one of the counterbalancing masses towards the other counterbalancing mass so as to engage with at least one abutment surface of the other counterbalancing mass.

15. An automatic balancing device as claimed in claim 14, wherein the other counterbalancing mass has a first abutment surface located and arranged such that, when a projection engages therewith, the first counterbalancing mass is prevented from leading the second counterbalancing mass by more than substantially 180°.

16. An automatic balancing device as claimed in claim 15, wherein the other counterbalancing mass has a second abutment surface located and arranged such that, when a projection engages therewith, the first counterbalancing mass is prevented from lagging behind the second counterbalancing mass.

17. An automatic balancing device as claimed in claim 15, wherein the abutment surfaces are located on the first counterbalancing mass and the projection is located on the second counterbalancing mass.

18. An automatic balancing device as claimed in claim 1, further comprising a collar disposed about the axis between the first counterbalancing mass and the second counterbalancing mass, the collar being rotatable freely about the axis, wherein the constraint is provided on the collar.

19. An automatic balancing device as claimed in claim 18, wherein the constraint comprises first and second projections extending outwardly from the collar so as to engage with shapings of the first and second counterbalancing masses and thereby prevent the first counterbalancing mass from leading the second counterbalancing mass by more than substantially 180°.

20. An automatic balancing device as claimed in claim 1, further comprising at least one further counterbalancing mass provided in the chamber, the arrangement being such that, in use, the first counterbalancing mass leads the further counterbalancing mass and the constraint is adapted to prevent the first counterbalancing mass from leading the or any further counterbalancing mass by more than substantially 180° when the device is in use.

21. An automatic balancing device as claimed in claim 20, wherein the moment of inertia of the further counterbalancing mass is higher than the moment of inertia of the first counterbalancing mass.

22. An automatic balancing device as claimed in claim 20, wherein the constraint is adapted to prevent the first counterbalancing mass from lagging behind the further counterbalancing mass.

23. An automatic balancing device as claimed in claim 20, further comprising one further counterbalancing mass provided in the chamber.

24. A washing machine comprising;
a drum rotatable about an axis; and
an automatic balancing device comprising:
a chamber having an outer wall and the axis, and which rotates with the drum,
first and second counterbalancing masses spaced along the axis and constrained to move freely in a circular path about the axis and within the chamber such that, when the device is in use, the first counterbalancing mass leads the second counterbalancing mass, a viscous fluid provided in the chamber so as to provide viscous coupling between the outer wall of the chamber and each of the counterbalancing masses when the device is in use, and a constraint operating at all speeds of rotation when the device is in use to prevent the first counterbalancing mass from leading the second counterbalancing mass by more than substantially 180° at all speeds of rotation when the device is in use, wherein the first counterbalancing mass and the second counterbalancing mass are spaced along the axis such that the first counterbalancing mass is spaced further from a side of the chamber than the second counterbalancing mass such that the viscous coupling between the first counterbalancing mass and the outer wall of the chamber is higher than the viscous coupling between the second counterbalancing mass and the outer wall of the chamber, and the chamber and the drum are arranged so that their axes are collinear.

* * * * *